United States Patent [19]
Uematsu

[11] Patent Number: 5,505,440
[45] Date of Patent: Apr. 9, 1996

[54] APPARATUS FOR TRANSPORTING CARD-LIKE ARTICLES

[75] Inventor: Masaki Uematsu, Kanagawa, Japan

[73] Assignee: Kabushiki Kaisha Toshiba, Kawasaki, Japan

[21] Appl. No.: 264,302

[22] Filed: Jun. 23, 1994

[30] Foreign Application Priority Data

Jun. 25, 1993  [JP]  Japan ................................. 5-154930

[51] Int. Cl.⁶ ........................................... B65H 7/02
[52] U.S. Cl. ...................... 271/258.01; 271/182; 271/301
[58] Field of Search ...................... 271/182, 301, 271/258, 259, 3.1, 2, 258.01; 209/584, 659

[56] References Cited

U.S. PATENT DOCUMENTS 5,048,694  9/1991  Iwamoto ................................. 209/540

FOREIGN PATENT DOCUMENTS

2230515  10/1990  United Kingdom ................. 271/182

*Primary Examiner*—David H. Bollinger
*Attorney, Agent, or Firm*—Cushman Darby & Cushman

[57] ABSTRACT

An apparatus for transporting card-like articles includes a feeding unit for feeding card-like articles, and a shingler conveying unit comprising a first belt which moves in a first running speed and a second belt which moves in a second running speed different from the first running speed for transporting card-like articles fed from the feeding unit in a prescribed direction while holding them by the first and second belts. The apparatus further includes a first measuring unit provided in a preceding stage of the shingler conveying unit for measuring lengths of the card-like articles along the transporting direction, a second measuring unit provided in a succeeding stage of the shingler conveying unit for measuring lengths of the card-like articles along the transporting direction, and an abnormality detecting unit for detecting abnormality in conveying card-like articles based on measured results of the first and the second measuring unit.

16 Claims, 7 Drawing Sheets

APPARATUS FOR TRANSPORTING CARD-LIKE ARTICLES

BACKGROUND OF THE INVENTION

1. Field of the Invention

The present invention relates to an apparatus for transporting card-like articles that is incorporated in a culler-facer-canceller for processing mail, etc.

2. Description of the Related Art

On a conventional culler-facer-canceller that processes transported mail, such information as stamps, metered marks, pre-printed indicia, etc. pasted/written on prescribe positions are determined. In addition, physical properties of mail, for instance, size, thickness, etc. are also determined. While mail processing speed is being increased and kinds of mail are more and more diversified in these days, in order to realize these functions there is an apparatus for transporting card-like articles provided with a mechanism to prevent overlapped mail from being transported. This apparatus is in such a construction as described below.

Figure 1:
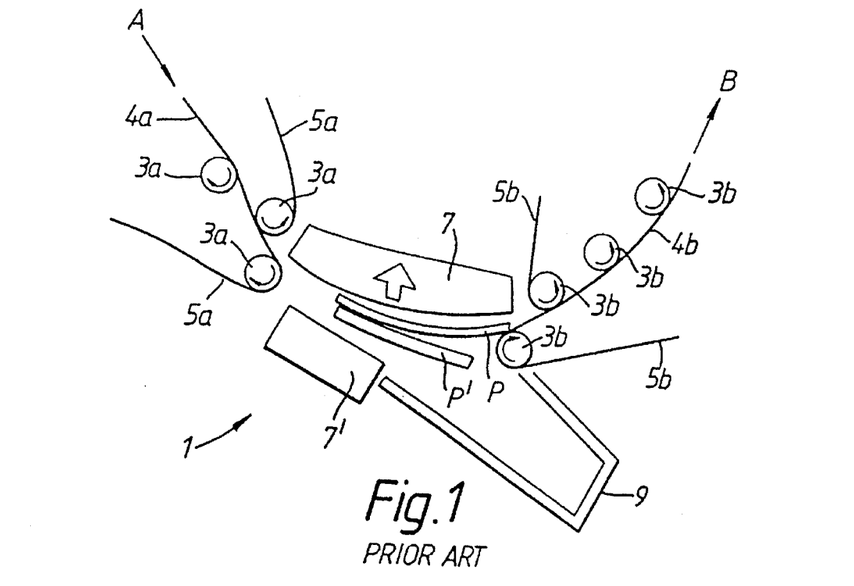
FIG. 1 is a brief construction diagram of a conventional apparatus for transporting card-like articles having a mechanism to prevent overlapped mail from being transported.

That is, as shown in FIG. 1, on an apparatus 1 for transporting mail P, a pair of transport belts 5a are put over a plurality of rollers 3a and a pair of transport belts 5b are put over a plurality of rollers 3b. The transport belts 5a transport mail P being held between the pair of transport belts 5a in an A direction. The transport belts 5b transport mail P being held between the pair of transport belts 5b in a B direction. There is a first adsorbing vacuum chamber 7 having a prescribed curvature on its adsorbing surface arranged between the first transport path 4a and the second transport path 4b. A transporting path having a prescribed curvature is formed by these transport belts 5a, 5b and the first adsorbing vacuum chamber 7. The first adsorbing vacuum chamber 7 adsorbs a mail P transported from the direction A by a pair of the transport belts 5a and sends out the mail P in the direction B via a pair of the transport belts 5b. Opposing to the first adsorbing vacuum chamber 7 and with a prescribed space, there is a second adsorbing vacuum chamber 7' having a flat. adsorbing surface is arranged. In addition, there is a reject chute 9 provided on the extension of the second adsorbing vacuum chamber 7' The reject chute 9 is to store the mail P', which has not been transported by the first adsorbing vacuum chamber 7 and the belts 5b, for rejecting after the mail P' is separated from the mail P which has been transported with the mail P' in overlapped state.

On such an apparatus for transporting card-like articles as described above, if mails P and P' are transported in the overlapped state from the direction A, the mail P is adsorbed by the first adsorbing vacuum chamber 7 and transported in the direction B via the belts 5b. On the other hand, the mail P' is adsorbed by the second adsorbing vacuum chamber 7', separated from the mail P by the curvature of the first adsorbing vacuum chamber 7 and rigidity of the mail P' and transported into the reject box 9. This storage into the reject box 9 prevents a plurality of mail from being transported to the latter stage.

However, on such the apparatus for transporting card-like articles as this, if a plurality of mail were off-set and overlapped in the transporting direction, all mail was adsorbed by the first adsorbing vacuum chamber 7 and transported to the belts 5b in the latter stage. Therefore, it was difficult to completely prevent overlapped mail from being transported.

As described above, on a conventional apparatus for transporting card-like articles, if mail is taken out in the off-set and overlapped state, all of them are transported together and therefore, it was difficult to prevent them from being transported to the latter stage.

SUMMARY OF THE INVENTION

It is an object of the present invention to provide an apparatus for transporting card-like articles that makes it possible to accurately process mail in the latter stage by positively detecting card-like articles transported in the overlapped state.

According to the present invention, there is provided an apparatus for transporting card-like articles comprising feeding means for feeding card-like articles, shingler conveying means comprising a first belt which moves in a first running speed and a second belt which moves in a second running speed different from the first running speed for transporting card-like articles fed from the feeding means in a prescribed direction while holding them by the first and second belts, first measuring means provided in a preceding stage of the shingler conveying means for measuring lengths of the card-like articles along the transporting direction, second measuring means provided in a succeeding stage of the shingler conveying means for measuring lengths of the card-like articles along the transporting direction, and abnormality detecting means for detecting abnormality in transporting card-like articles based on measured results of the first and the second measuring means.

Further, according to the present invention, there is provided an apparatus for transporting card-like articles comprising feeding means for feeding card-like articles, shingler conveying means for transporting a plurality of card-like articles by off-setting them in a prescribed direction if they are fed in the overlapped state, first measuring means provided in a preceding stage of the shingler conveying means for measuring lengths of the card-like articles along the transporting direction, second measuring means provided in a succeeding stage of the shingler conveying means for measuring lengths of the card-like articles along the transporting direction, and abnormality detecting means for detecting abnormality in transporting card-like articles based on measured results of the first and the second measuring means.

Furthermore, according to the present invention, there is provided an apparatus for transporting card-like articles comprising feeding means for feeding card-like articles; shingler conveying means comprising a first belt which moves in a first running speed, a second belt which moves in the first running speed in accordance with the moving of the first belt and a third belt which moves in a second running speed different from the first running speed for transporting card-like articles fed from the feeding means in a prescribed direction while holding them by the first and second belts, then holding them by the first and third belts, and then holding them by the first and second belts; first measuring means provided in a stage positioned before the card-like articles being held by the first and third belts in the shingler conveying means for measuring lengths of the card-like articles along the transporting direction; second measuring means provided in a stage positioned after the card-like articles being held by the first and third belts in the shingler conveying means for measuring lengths of the card-like articles along the transporting direction; and abnormality detecting means for detecting abnormality in transporting card-like articles based on measured results of the first and the second measuring means.

DETAILED DESCRIPTION OF THE DRAWINGS

DETAILED DESCRIPTION OF THE PREFERRED EMBODIMENT

Figure 2:
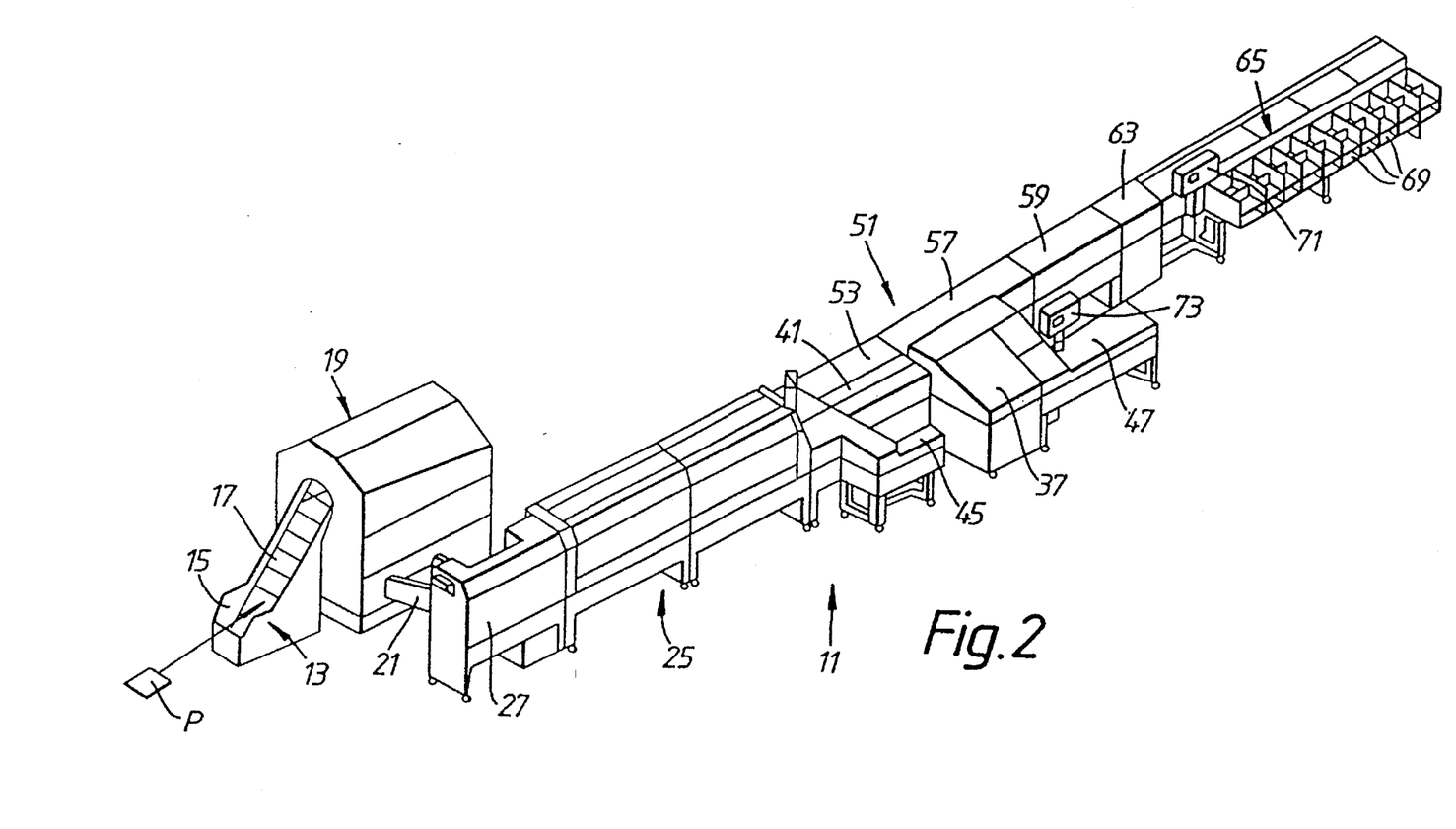
FIG. 2 is an external perspective view of a culler-facer-canceller in which an apparatus for transporting card-like articles of the present invention is incorporated.
Figure 3:
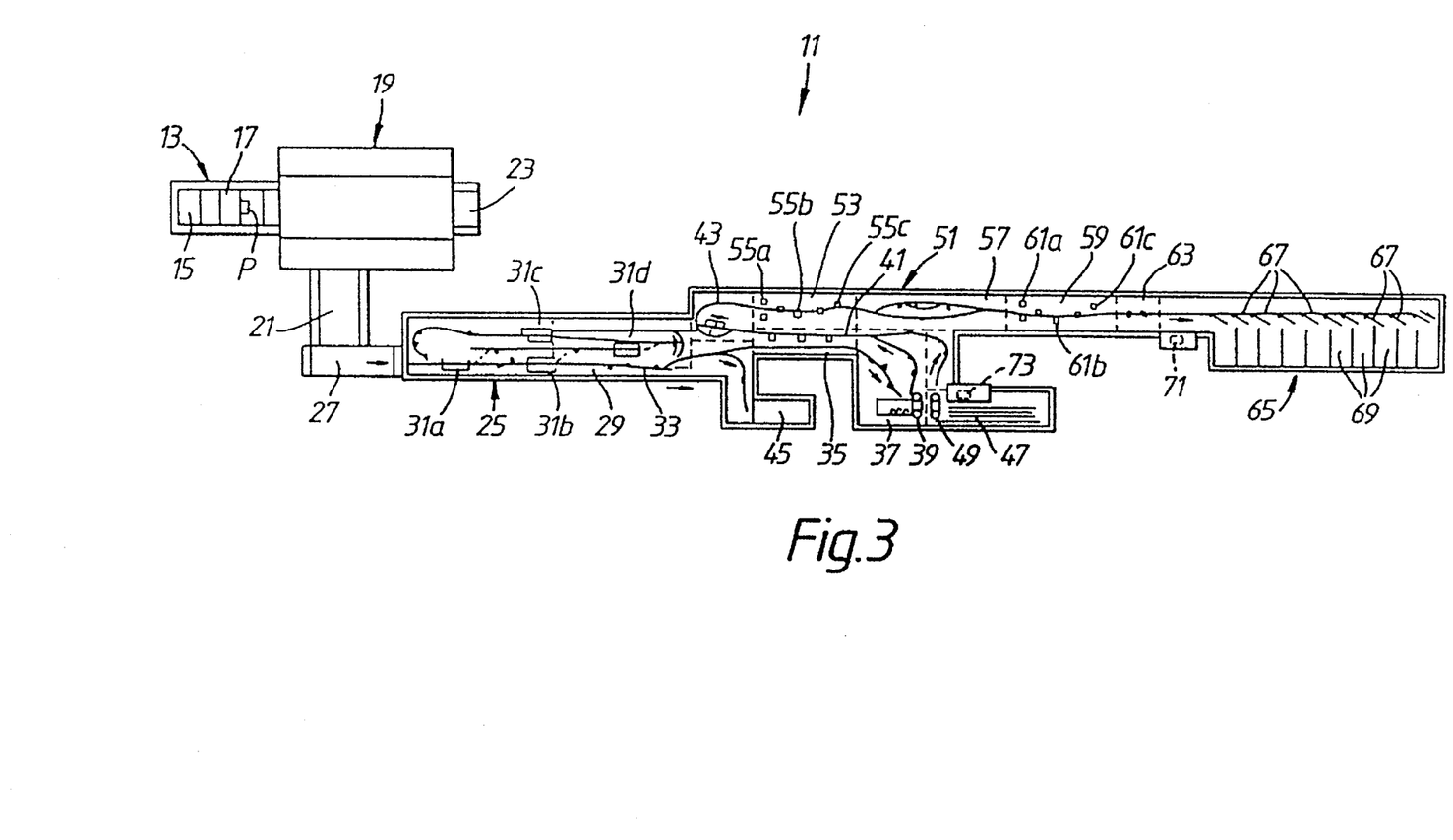
FIG. 3 is a top view of the culler-facer-canceller shown in FIG. 2.

Hereinafter, an embodiment of the present invention will be described with reference to the drawings. First, the construction of a culler-facer-canceller in which an apparatus for transporting card-like articles of the present invention is incorporated will be described with reference to FIGS. 2 and 3. FIG. 2 is an external perspective view of the culler-facer-canceller and FIG. 3 is its top view.

A culler-facer-canceller 11 is provided with a feed hopper 13 to accept a lot of mail P in diversified thicknesses and widths and feed them to the next stage. This feed hopper 13 has a hopper 15. In addition, the feed hopper 13 is also provided with a feed conveyor 17 to transport mail P to a thickness selecting unit 19 which will be described below. The thickness selecting unit 19 selects mail P in various thickness and sorts them into mail in prescribed thickness and mail in thickness other than prescribed thickness. The mail P in prescribed thickness selected by the thickness selecting unit 19 are dropped on a conveyor 21 via a descending path (not shown) and the mail P in other than prescribed thickness are discharged into a reject unit 23.

A flats ejector 25 comprises a trough conveyor 27 which is to place mail P transported on the conveyor 21 in the erected state, a transport path 29 which is to transport the mail P placed in the erected state by the trough conveyor 27, selectors 31a, 31b, 31c and 31d for selecting the mail P in other than prescribed width from the mail P transported by the transport path 29, and an aligning unit 33 which is to align the lengthwise and breadthwise directions of the mail P. The mail P in other than prescribed width selected by the selectors 31a, 31b, 31c and 31d are rejected in the reject unit 23 via a rejecting transporting path and a chute (not shown).

The mail P in the fixed form in the prescribed width selected by the flats ejector 25 are sent to the transport path 35. This transport path 35 feeds the mail P of which lengthwise and breadthwise directions have been aligned in the aligning unit 33 to a buffer 37.

The buffer 37 is to send out received mail P by one at a time at regular intervals. The mail P are adsorbed by a vacuum chamber 39 provided at the buffer 37 and transported by a transporting belt (not shown). The mail P are transported to a shingler conveyor 41 from the buffer 37. The shingler conveyor 41 is to release the conveyance of overlapped mail P. The details of this shingler conveyor 41 will be described later. In the shingler conveyor 41, the mail P are sent to a recycle path 43. Further, there is an auxiliary stacker 45 arranged near the flats ejector 25 for temporarily stacking mail P from the flats ejector 25 if the buffer 37 is full with mail P. In addition, there is a local stacker 47 arranged near the buffer 37 for directly stacking and feeding fixed form mail P in the fixed form without passing through the feed hopper 13, the thickness selecting unit 19 and the flats ejector 25. The local stacker 47 has a vacuum chamber 49 which sends out mail P stacked by belts not shown in the local stacker 47 to the shingler conveyor 41 by one at a time at regular intervals.

The recycle path 43 is to selectively send out the mail P sent out from the shingler conveyor 41 to a detector 51 which will be described later or the flats ejector 25 in response to a signal from the shingler conveyor 41. The recycle referred to here does mean that mail P are conveyed to the flats ejector 25 provided at the upper stream.

The mail P passed through the shingler conveyor 41 are sent out to a first reader 53 of the detector 51. The first reader 53 has a first through a third detectors 55a, 55b and 55c and reads detecting objects such as postage stamps pasted or indicias stamped on the prescribed positions of mail P. There is an inverting unit 57 arranged at the downstream of the first reader 53. The inverting unit 57 has a function to invert a mail upside down if its detecting objects could not be read. This inverting operation is not carried out when detecting objects have been read by the first detector 53. The mail P sent out of the inverting unit 57 are fed to a second reader 59.

The second reader 59 has a first through a third detectors 61a, 61b and 61c and reads detecting objects of mail P likewise the first reader 53 described above. The mail P as a detected matter sent out of the second reader 59 are canceled by a canceling unit 63. The mail P canceled by this canceling unit 63 are fed to a stacker 65.

The stacker 65 is composed of a plurality of diverters 67 which are driven according to information read by the first reader 53 or the second reader 59 and a plurality of partitions installed corresponding to these diverters 67. Mail P are sorted into, for instance, special delivery, ordinary mail, etc. and stocked in the stacker 65.

There is a display device 71 installed between the canceling unit 63 and the stacker 65 to display the operating state of the culler-facer-canceller. In addition, there is arranged a main controller 73, which is operated by an operator, near the local stacker 47.

Figure 4:
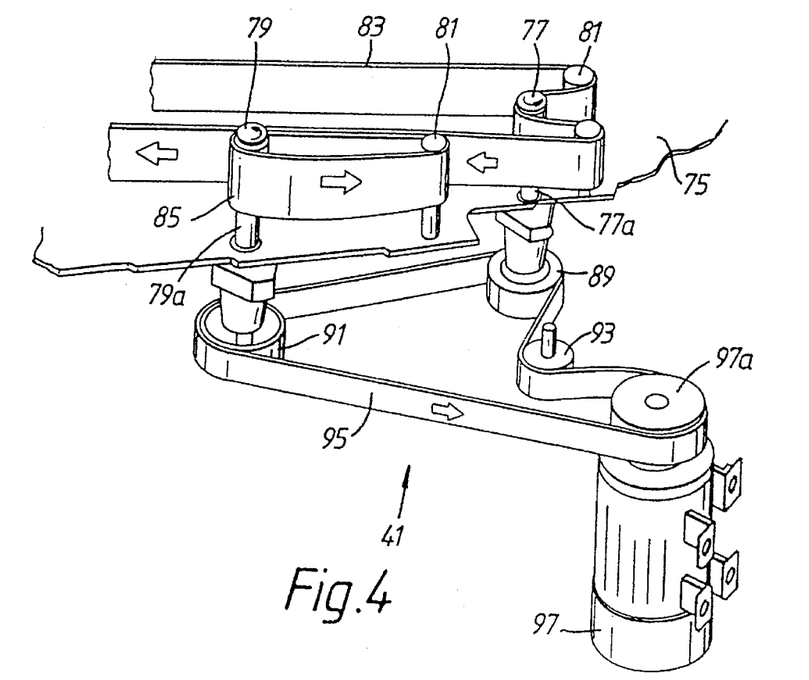
FIG. 4 is a perspective view showing a shingler conveyor and its peripheral units of the apparatus for transporting card-like articles of the present invention.
Figure 5:
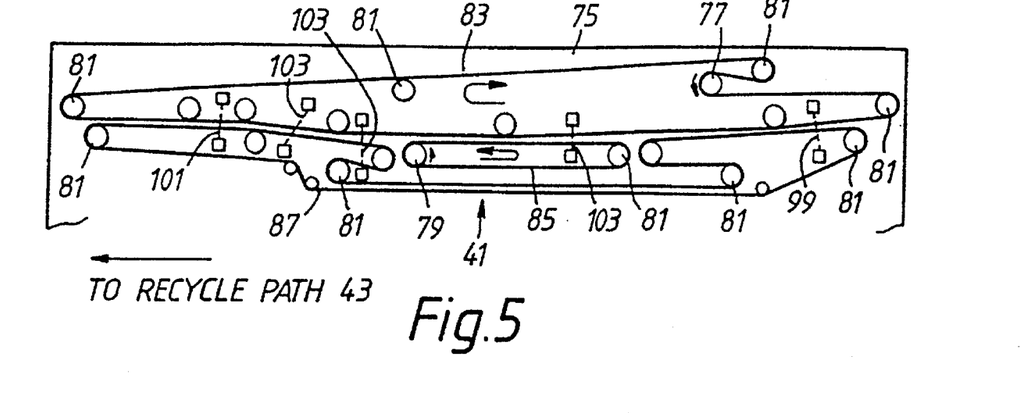
FIG. 5 is a top view showing the shingler conveyor and its peripheral units shown in FIG. 4.

Next, referring to FIGS. 4 and 5, the construction of the shingler conveyor 41 as the apparatus for transporting card-like articles of the present invention will be described. FIG. 4 is a perspective view showing the shingler conveyor 41 and its peripheral units and FIG. 5 is a top view showing the shingler conveyor 41.

In the shingler conveyor 41, there are a first drive roller 77 and a second drive roller 79 mounted via a first rotation axes 77a and 79a respectively on a base plate 75. In addition to the first and the second drive rollers 77 and 79, there are arranged a plurality of idle rollers 81.

A first transport belt 83 is put over the first drive roller 77 and the idle rollers 81. Further, a second transport belt 85 is put over the second drive roller 79 and the idle roller 81 so as to arrange them in close vicinity to the first transport belt 83. Furthermore, as shown in FIG. 5, a third transport belt 87 is put over a plurality of idle rollers 81. Mails P are transported to the path 43 while being held between the first transport belt 83 and the second transport belt 85, and the first transport belt 83 and the third transport belt 87. The mail P are transported when the first through the third transport belts 83, 85 and 87 are generally moved straightforwardly as the first and the second drive rollers 77 and 79 are rotated in the direction of arrow by an AC motor that will be described later.

Although the running speed of the first transport belt 83 is the same as that of the third transport belt 87 since the third transport belt 87 follows the first transport belt 83, the running speeds of the first and the third transport belts 83 and 87 differ from that of the second transport belt 85. That is, the running speeds of the first transport belt 83 and the third transport belt 87 have been set at 4.0 m/sec. while that of the second transport belt 85 has been set at 3.7 m/sec.

As shown in FIG. 4, the first and the second drive rollers 77 and 79 are connected with drive pulleys 89 and 91 via the first and second rotation axes 77a and 79a respectively, which are arranged on the underside of the base plate 75. The first and the second drive rollers 77 and 79 are set in the same diameter, while the drive pulley 89 is set in a diameter smaller than that of the drive pulley 91. Further, an idle roller 93 is mounted on the underside of the base plate 75. A drive belt 95 is put over the idle roller 93 and the drive pulleys 89 and 91. The drive belt 95 is further put over a pulley 97a of an AC motor 97 and is moved in the direction of an arrow by driving of the AC motor 97.

As the drive pulley 89 is set in a diameter smaller than that of the drive pulley 91, the rotating speeds of the first and the second drive rollers 77 and 79 connected to the drive pulleys 89 and 91 when driven by the AC motor 97 differ from each other. That is, when the AC motor 97 is driven, the drive roller 77 rotates faster than the drive roller 79. Therefore, the transporting speed of the first transport belt 83 becomes faster than that of the second transport belt 85. That is, as described above, the running speed of the first transport belt 83 is 4.0 m/sec. and the running speed of the second transport belt 85 is 3.7 m/sec.

As a result, mail P transported in the overlapped state are off-set from each other in the transporting direction when passed through the shingler conveyor 41. It is possible to prevent wear and tear of the belts due to a difference in transporting speeds when the first transport belt 83 and the second transport belt 85 of the shingler conveyor 41 are kept separated so that they are not in contact with each other when there is no mail P.

As shown in FIG. 5, there are length measuring sensors 99 and 101 arranged almost orthogonally to the first and the third transport belts 83 and 87, respectively at the upper stream and the downstream sides of the shingler conveyor 41. These length measuring sensors 99 and 101 form an optical path, respectively and measure a length of mail P being transported at a length measuring unit 105, that is described later, by counting clock pulses of a time when the mail P intercepts this optical path.

Further, there are a plurality of sensors 103 arranged between the first and the second transport belts 83 and 85 or the first and the third transport belts 83 and 87. These sensors 103 are to detect and confirm a location where mail P being transported are present in the culler-facer-canceller 11.

Figure 6:
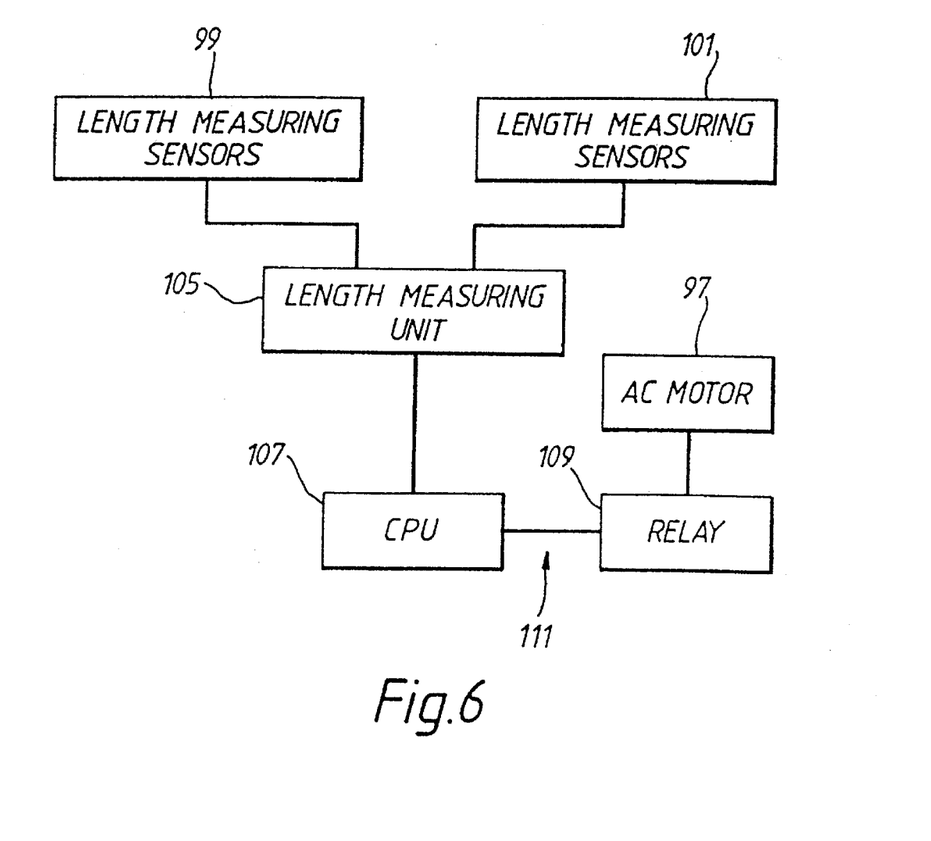
FIG. 6 is a block diagram for controlling the operation of the apparatus for transporting card-like articles of the present invention.

Next, with reference to FIG. 6, the construction of a control section 111 of the shingler conveyor 41 will be described. Signals received by the length measuring sensors 99 and 101 are processed in the length measuring unit 105 and lengths of mail P when they passed through the length measuring sensors 99 and 101 are measured and calculated, respectively. Based on the results of this operation, a CPU 107 judges whether mail P are transported in overlapped state. This judgment will be described later. The CPU 107 is connected to the AC motor 97 via a relay 109 and controls the driving of AC motor 97.

Figure 7:
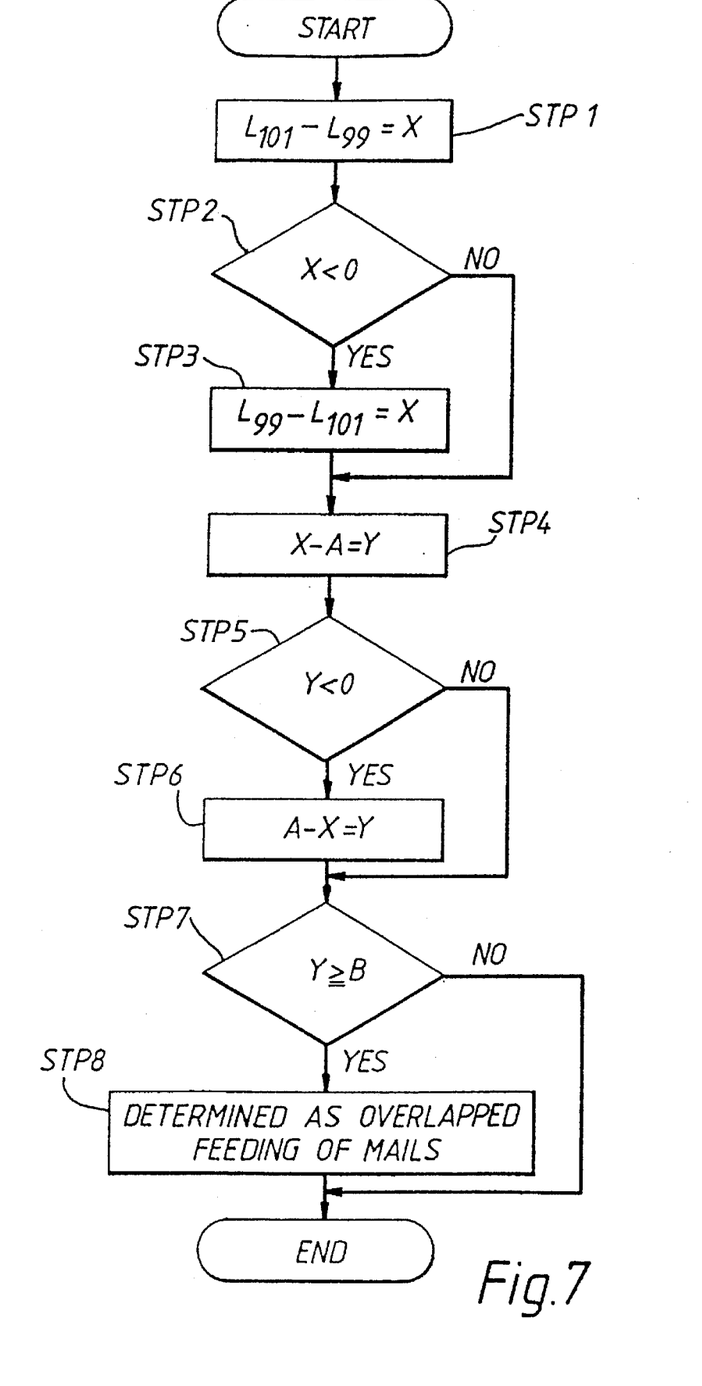
FIG. 7 is a flowchart showing the operation for judging transportation of overlapped mail by the apparatus for transporting card-like articles, that is, the shingler conveyor of the present invention.

Next, with reference to FIG. 7, a method to judge overlapped mail being transported in the shingler conveyor 41 will be described. FIG. 7 is a flowchart showing the judgment of mail being transported in the shingler conveyor 41.

A difference between a length of mail P detected in the length measuring sensor 101 and that detected in the length measuring sensor 99 is obtained (Step 1). The length of mail P measured by the length measuring sensor 101 is denoted as $L_{101}$ and that measured by the length measuring sensor 99 is denoted as $L_{99}$. Further, a difference in these lengths is assumed to be X.

Based on the result of operation in Step 1, it is judged whether X is smaller than 0 (Step 2).

Based on the result of judgment in Step 2, if X is smaller than 0, a difference between the length of mail P detected in the length measuring sensor 99 and that detected in the length measuring sensor 101 is obtained (Step 3).

From a value X larger than 0 in Step 2 or a value X larger than 0 obtained based on the result of operation in Step 3, a constant A is subtracted (Step 4). Here, a value of the constant A is assumed to be 7. Further, the constant A is determined as appropriate according to such conditions as a length of the mail P and a difference in the running speeds of the first transport belt 83 and that of the second transport belt 85, etc. Further, a value obtained from this operation is assumed to be Y.

It is judged whether a value Y obtained by the operation in Step 4 is smaller than 0 (Step 5).

Based on the result in Step 5, if a value of Y is smaller than 0, a value X is subtracted from the constant A (Step 6). A value obtained here is assumed to be Y.

It is judged whether a value of Y which is larger than 0 based on the result of operation in Step 4 or a value of Y obtained in Step 6 is larger than a judging value showing the overlapped mail (Step 7). Here, the judging value showing the transportation of overlapped mail is expressed as B, which is assumed to be 15. Further, likewise the constant A described above, the judging value B showing an overlapped mail being transported is determined as appropriate according to such conditions as a length of mail P, a difference in running speeds of the first and the second transport belts 83 and 85, etc.

A value larger than the judging value B showing the transportation of overlapped mail in Step 7 is judged that the overlapped mail are transported (Step 8).

Figure 8:
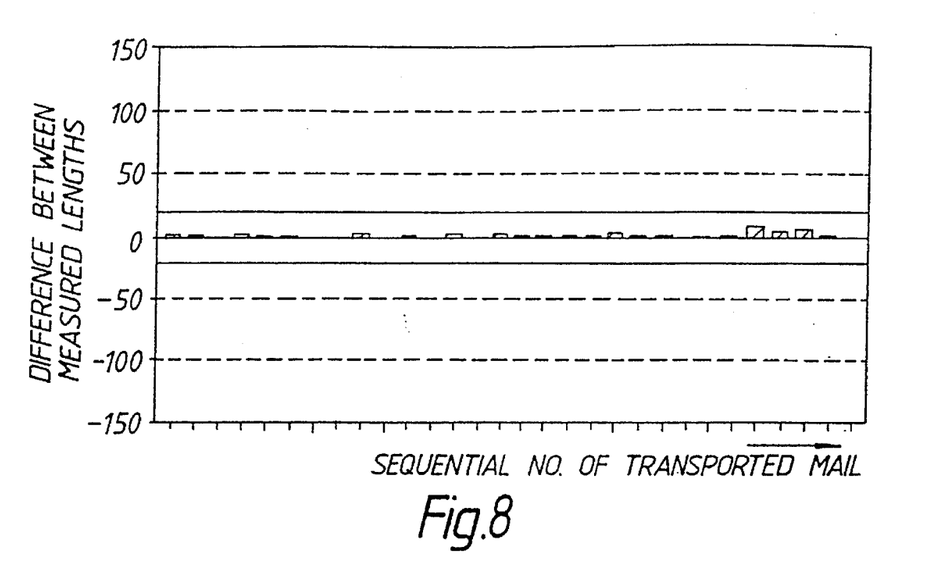
FIG. 8 is a graph showing the measuring result of only a single mail in the shingler conveyor.
Figure 9:
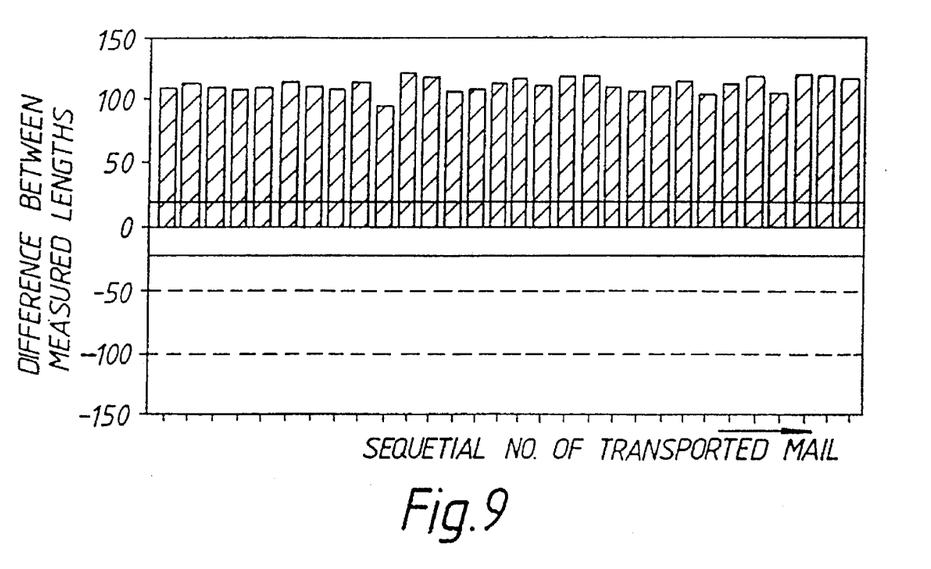
FIG. 9 is a graph showing the measuring result of the state of transporting overlapped mail in the shingler conveyor.

Next, the operation of the culler-facer-canceller 11 with the shingler conveyor 41 incorporated as an apparatus for transporting card-like articles in the construction as described above will be explained. FIGS. 8 and 9 are graphs showing the test results of a single mail and an overlapped mail transported successively by the shingler conveyor 41.

Figure 10:
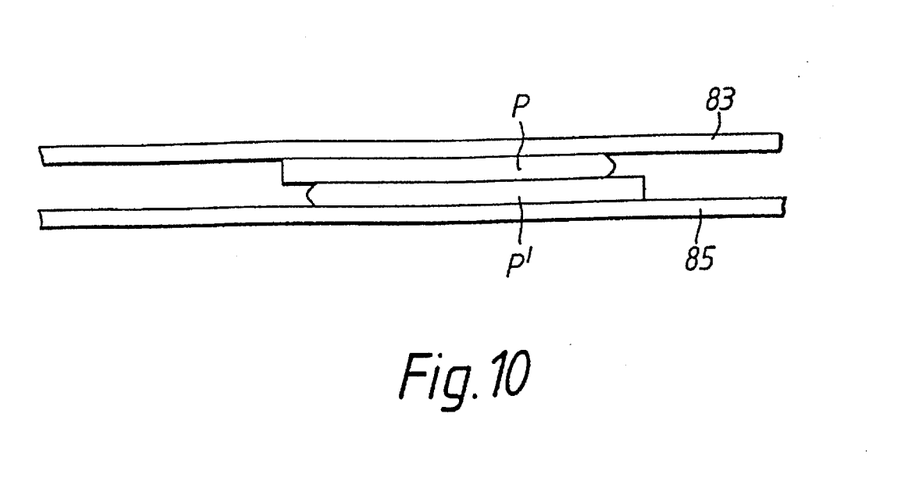
FIG. 10 is a top view of the state of two overlapped mail being transported in the shingler conveyor.
Figure 11:
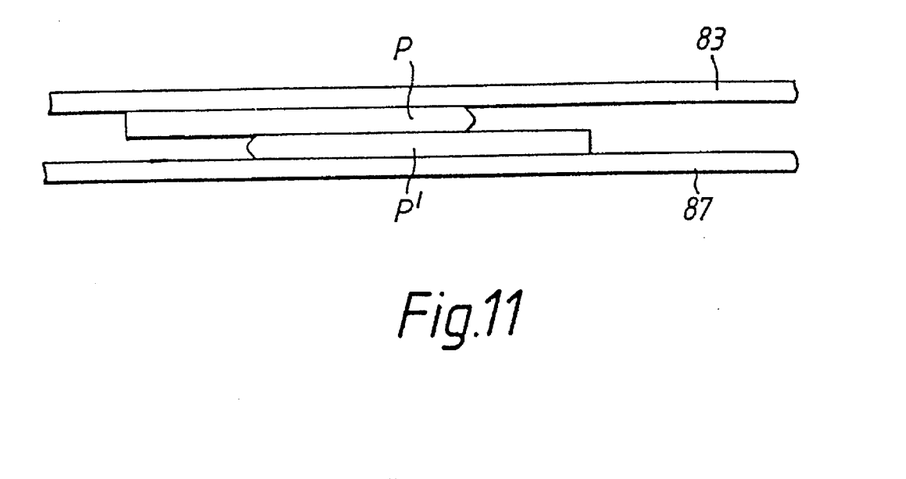
FIG. 11 is a top view of the state of two overlapped mail being transported after passed through the shingler conveyor.

That is, shown in these figures are differences between lengths of mail measured by the first and the second length measuring sensors 99 and 101. FIG. 10 is a diagram showing the state of mail being transported in the shingler conveyor 41 and FIG. 11 is a diagram showing the state of mail after passed through the shingler conveyor 41.

Mails P charged into the feed hopper 13 pass through the thickness selecting unit 19 and the flats ejector 25, where they are sorted according to thickness and width, and transported to the buffer 37 via the transport path 35. The mail P are sent out by one mail at a time at regular intervals to the shingler conveyor 41 from the buffer 37. In the shingler conveyor 41, the AC motor 97 is driven under the control of the CPU 107. When the AC motor 37 is driven, the first through the third transport belts 83, 85 and 87 are operated. The lengths of the mail P in the transporting direction before and after transported by the second transport belt 85 are measured by the length measuring sensors 99 and 101, respectively.

In the case where a single mail is transported, almost no difference is recognized in the measured lengths as shown in FIG. 8. That is, there is no difference between respective lengths of mail P measured by the length measuring sensors 99 and 101.

Next, a case where two mail P are sent out to the shingler conveyor 41 in the overlapped state will be described.

It is now assumed that mails P and P' are fed to the shingler conveyor 41 in the state shown in FIG. 10. As the running speeds of the first and the second transport belts 83 and 85 differ each other as described above, the mail P kept in contact with the first transport belt 83 is transported fast and the mail P' kept in contact with the second transport belt 85 is transported slowly. Thus, after transporting by the first and second transport belts 83 and 85, when the mails P and P' are arrived at a position where the first and third transport belts 83 and 87 transport them, the mail P kept in contact with the first transport belt 83 is more off-set in the transporting direction against the mail P' kept in contact with the third transport belt 87. Therefore, a total length of the mails P and P' along the transporting direction in the overlapped state becomes longer than that before passing through the second transport belt 85 as shown in FIG. 11.

Therefore, when overlapped mail are transported, a length of mail P first transported by the first and second transport belts 83 and 85 in the transporting direction is measured by the length measuring sensor 99 and a length of subsequently transported mail P is measured by the length measuring sensor 101 and a difference between these measured values thus obtained is as shown in FIG. 9. It is then judged whether overlapped mail are transported by executing the process as explained with reference to FIG. 7 based on the value of difference obtained by this measurement.

As it is possible to judge whether overlapped card-like articles are transported, the process in the latter stage can be positively coped with.

Mails P and P' that are judged as transported in the overlapped stated are returned to the flats ejector 25 by the action of gates (not shown), which are arranged in the recycle path 43, and taken out again therefrom. Mails P that are not judged as transported in the overlaped stated are canceled in the canceling unit 63 after passing through the recycle path 43 and the detector 51. Thereafter, they are sorted and stacked in the stacker 65 by the gates 67.

The present invention is not limited to the embodiment described above. In the recycle embodiment it is described that all of transported mail are sent out to the path 43. It may be so constructed that a plurality of mail are completely separated by providing belts having different running speeds like the first and the second transport belts and thereafter, are sent out to the detector without sending to the flats ejector. Further, it may be so constructed that the horizontal transport belt and the vertical transport belt are combined to off set overlapped card-like articles in the transporting direction and the vertical direction each other. Thus, it is possible to apply the present invention in various forms unless departing from the spirit and scope thereof.

As described above, it is an object of the present invention to provide an apparatus for transporting card-like articles which is capable of completely detecting a plurality of card-like articles being transported in overlapped state to assure a positive execution of the process in the latter stage.

What is claimed is:

1. An apparatus for transporting card-like articles comprising:

feeding means for feeding card-like articles;

shingler conveying means comprising a first belt which moves in a first running speed and a second belt which moves in a second running speed different from the first running speed for transporting card-like articles fed from the feeding means in a prescribed direction while holding them by the first and second belts;

first measuring means provided in a preceding stage of the shingler conveying means for measuring lengths of the card-like articles along the transporting direction;

second measuring means provided in a succeeding stage of the shingler conveying means for measuring lengths of the card-like articles along the transporting direction; and abnormality detecting means for detecting abnormality in transporting card-like articles based on measured results of the first and the second measuring means.

2. An apparatus according to claim 1, wherein the first and second belts of the shingler conveying means are arranged with a prescribed gap provided between them so that they are not in contact with each other.

3. An apparatus according to claim 1, wherein the shingler conveying means includes a single driving unit for driving the first and second belts.

4. An apparatus according to claim 1, wherein the shingler conveying means includes:

a first drive roller over which the first belt is put, the first drive roller having a first rotation axis;

a first drive pulley having a first diameter connected with the first rotation axis of the first drive roller;

a second drive roller over which the second belt is put, the second drive roller having a second rotation axis;

a second drive pulley having a second diameter larger than that of the first diameter connected with the second rotation axis of the second drive roller;

a third belt put over the first and second drive pulleys; and a single driving unit for moving the third belt to cause the moving of the first and second belts.

5. An apparatus according to claim 1, wherein the abnormality detecting means detects abnormality in transporting card-like articles if a difference between measured results of the first and second measuring means is more than a prescribed value.

6. An apparatus according to claim 1 further comprising recycle means for returning card-like articles to the feeding means when the abnormality detecting means detects any abnormality.

7. An apparatus for conveying card-like articles comprising:

feeding means for feeding card-like articles;

shingler conveying means for conveying a plurality of card-like articles by off-setting them in a prescribed direction if they are fed in the overlapped state;

first measuring means provided in a preceding stage of the shingler conveying means for measuring lengths of the card-like articles along the transporting direction;

second measuring means provided in a succeeding stage of the shingler conveying means for measuring lengths of the card-like articles along the transporting direction; and abnormality detecting means for detecting abnormality in transporting card-like articles based on measured results of the first and the second measuring means.

8. An apparatus according to claim 7, wherein the abnormality detecting means detects abnormality in transporting card-like articles if a difference between measured results of the first and second measuring means is more than a prescribed value.

9. An apparatus according to claim 7 further comprising recycle means for returning card-like articles to the feeding means when the abnormality detecting means detects any abnormality.

10. An apparatus for conveying card-like articles comprising:

feeding means for feeding card-like articles;

shingler conveying means comprising a first belt which moves in a first running speed, a second belt which moves in the first running speed in accordance with the moving of the first belt and a third belt which moves in a second running speed different from the first running speed for transporting card-like articles fed from the feeding means in a prescribed direction while holding them by the first and second belts, then holding them by the first and third belts, and then holding them by the first and second belts;

first measuring means provided in a stage positioned before the card-like articles being held by the first and third belts in the shingler conveying means for measuring lengths of the card-like articles along the transporting direction;

second measuring means provided in a stage positioned after the card-like articles being held by the first and third belts in the shingler conveying means for measuring lengths of the card-like articles along the transporting direction; and abnormality detecting means for detecting abnormality in conveying card-like articles based on measured results of the first and the second measuring means.

11. An apparatus according to claim 10, wherein the first and third belts of the shingler conveying means are arranged with a prescribed gap provided between them so that they are not in contact with each other.

12. An apparatus according to claim 10, wherein the shingler conveying means includes a single driving unit for driving the first and third belts.

13. An apparatus according to claim 10, wherein the shingler conveying means includes:

a first drive roller over which the first belt is put, the first drive roller having a first rotation axis;

a first drive pulley having a first diameter connected with the first rotation axis of the first drive roller;

a second drive roller over which the third belt is put, the second drive roller having a second rotation axis;

a second drive pulley having a second diameter larger than that of the first diameter connected with the second rotation axis of the second drive roller;

a fourth belt put over the first and second drive pulleys; and a single driving unit for moving the fourth belt to cause the moving of the first and third belts.

14. An apparatus according to claim 10, wherein the abnormality detecting means detects abnormality in transporting card-like articles if a difference between measured results of the first and second measuring means is more than a prescribed value.

15. An apparatus according to claim 10 further comprising recycle means for returning card-like articles to the feeding means when the abnormality detecting means detects any abnormality.

16. An apparatus according to claim 10, wherein the first measuring means measures lengths of the card-like articles when the card-like articles are held by the first and second belts before held by the first and third belts, and the second measuring means measures lengths of the card-like articles when the card-like articles are held by the first and second belts after held by the first and third belts.

* * * * *